United States Patent [19]

Engler

[11] 4,291,770
[45] Sep. 29, 1981

[54] LEVEE DISC APPARATUS

[76] Inventor: Louis C. Engler, Wilburn Rte., Box 382, Heber Springs, Ark. 72543

[21] Appl. No.: 112,555

[22] Filed: Jan. 16, 1980

[51] Int. Cl.³ .......................................... A01B 21/08
[52] U.S. Cl. ................................. 172/185; 172/441; 172/595; 172/583
[58] Field of Search .............. 172/187, 201, 440, 441, 172/451, 583, 587, 599, 594–596, 618, 640, 657, 696, 185

[56] References Cited

U.S. PATENT DOCUMENTS

| 297,666 | 4/1884 | Bramer | 172/587 |
|---|---|---|---|
| 561,988 | 6/1896 | Harmon | 172/187 |
| 853,160 | 5/1907 | Cass | 172/596 |
| 959,356 | 5/1910 | Krebs | 172/185 |
| 1,631,639 | 6/1927 | McDonald | 172/587 |
| 2,151,918 | 12/1936 | Ingram | 172/552 |
| 2,286,305 | 6/1942 | Priestley | 172/595 |
| 3,275,087 | 9/1966 | Peht | 172/572 |
| 4,029,155 | 6/1977 | Blair | 172/657 |

FOREIGN PATENT DOCUMENTS 1450535 9/1976 United Kingdom ................ 172/583

Primary Examiner—Richard J. Johnson
Attorney, Agent, or Firm—Walker & McKenzie

[57] ABSTRACT

A disc apparatus for forming levees used in rice farming and the like. The disc apparatus includes a longitudinal frame member onto which a pair of cross frame members are pivotally attached. A set of disc blades consisting of a plurality of disc blade members are attached to the opposite ends of each cross frame member. Each disc blade member of a set are of varying outside diameters with the disc blade member having the largest outside diameter located closest to the longitudinal frame member and with the size of each adjacent disc blade member uniformly decreasing so that the disc blade member having the smallest outside diameter will be located farthest from the longitudinal frame member. Each set of disc blade members can be adjusted so that the lowermost portion of each blade member thereof is level with the lowermost portion of each of the other blade members of that set.

3 Claims, 7 Drawing Figures

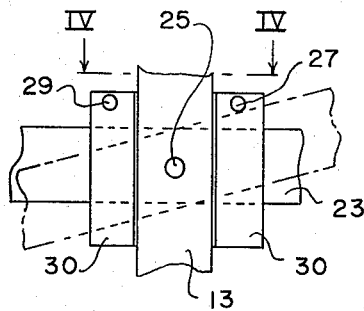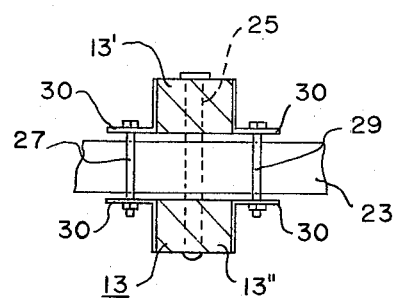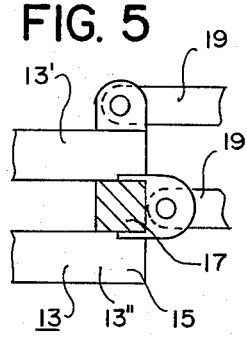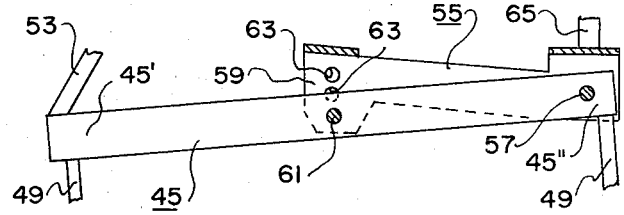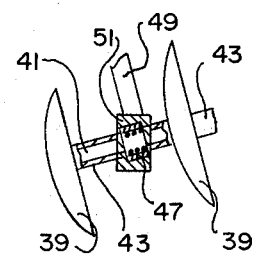

LEVEE DISC APPARATUS

BACKGROUND OF THE INVENTION

1. Field of the Invention

This invention relates to tractor pulled apparatuses for forming levees to hold water within a field used to grow rice and the like, and to contour rolling or hilly land to prevent erosion of the soil.

2. Description of the Prior Art

Tractor pulled apparatuses for forming levees have heretofore been developed. Such prior art apparatuses normally include two opposing sets of disc blades. These disc blade sets are constructed so that when pulled along the ground, dirt will be moved from beneath the disc blades to a location intermediate the two opposing sets thereby creating at least a portion of a levee. In utilizing such prior art apparatuses, three to six passes thereof over the same spot are normally made to build up the levee to its required size, depending on soil condition and the like. The combined width of the two opposing blade sets of such prior art apparatuses are normally about eight feet (roughly 2.4 meters) and each blade set is normally positioned on a downwardly and outwardly extending angle so that the outer disc blades of each blade set extend farther into the ground than the inner disc blades thereof. The levees produced by such prior art apparatuses have a relatively deep furrow (known to those skilled in the art as "bar pits") on either side thereof caused by the movement of the dirt on either side of the levee by the opposing blade sets in forming the levee. These relatively deep furrows can damage tractors, combines and the like driven thereover. Further, rice and the like will not grow along these furrows due to the depth of the water thereat when the fields encompassed by the levee is flooded. Additionally, the levees formed by such prior art devices are formed in part from dirt that is, in general, relatively high in acidity and alkaline (i.e., soil deeper than four inches or the like is normally higher in acidity and alkaline than the very topmost soil and levees formed by such prior art devices are formed in part from soil deeper than four inches).

The following patents disclose various farm implements which may be of interest: Dickinson, U.S. Pat. No. 1,504,104; Silver, U.S. Pat. No. 1,822,711; Coffing, U.S. Pat. No. 2,324,064; Fulper, U.S. Pat. No. T2,818,008; Richey U.S. Def. Pub. T875,003; Oelschlaeger, U.S. Pat. No. 3,730,280; and Frager, U.S. Pat. No. 3,830,313. None of the above patents disclose or suggest the present invention.

SUMMARY OF THE PRESENT INVENTION

The levee disc apparatus of the present invention is directed towards overcoming various problems of prior levee disc apparatuses. The concept of the present invention is to provide an apparatus that will form a levee out of only the uppermost layer of soil without creating deep furrows or the like.

The apparatus of the present invention comprises, in general, a longitudinal frame member having a forward end for being attached to a tractor; at least one cross frame member attached to the longitudinal frame member substantially transverse thereof; and at least one disc blade gang including a first disc blade set attached to the cross frame member on one side of the longitudinal frame member and a second disc blade set attached to the cross frame member on the other side of the longitudinal frame member. Each of the disc blade sets preferably include a plurality of disc blade members with each blade member having a different outside diameter and with the outside diameter of each blade member increasing at a substantially uniform rate from the blade member farthest from the longitudianl frame member to the blade member closest to the longitudinal frame member. The cross frame member is preferably pivotally attached to the longitudinal frame member. A second or rearward cross frame member is preferably attached to the longitudinal frame member and a second disc blade gang is preferably associated with the second cross frame member.

BRIEF DESCRIPTION OF THE DRAWINGS

FIG. 3 is an enlarged top plan view of a portion thereon showing a moved position in broken lines.

FIG. 4 is a sectional view as taken on line IV—IV of FIG. 3.

FIG. 5 is an enlarged sectional view of a portion thereof.

FIG. 6 is an enlarged sectional view of a portion thereof.

FIG. 7 is an enlarged sectional view of a portion thereof.

DESCRIPTION OF THE PREFERRED EMBODIMENT

Figure 1:
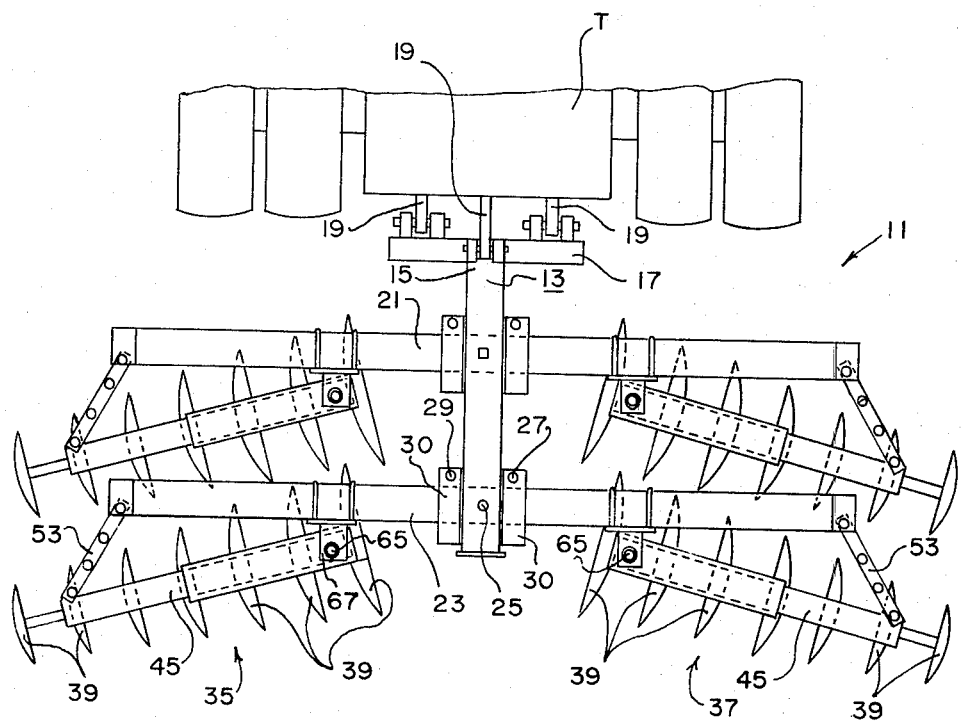
FIG. 1 is a top plan view of the levee disc apparatus of the present invention shown attached to a tractor.
Figure 2:
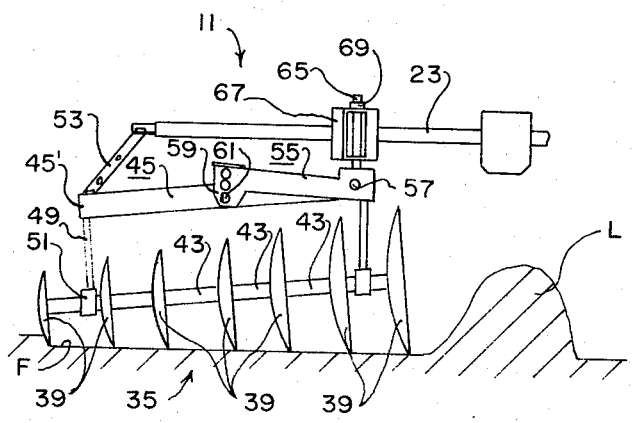
FIG. 2 is an end elevational view of a portion thereof showing a portion of a levee.

The levee disc apparatus 11 of the present invention is for being pulled by a tractor T to form levees L about fields used in growing rice and the like to allow the fields to be flooded (see, in general, FIGS. 1 and 2).

The disc apparatus 11 includes a longitudinal frame member 13 may consist of an upper longitudinal frame member 13' and a lower longitudinal frame member 13" (see FIGS. 4 and 5) fixedly joined together in a spaced apart manner for reasons which will hereinafter become apparent. The longitudinal frame member 13 has a forward end 15 for being attached to the tractor T in any manner apparent to those skilled in the art. For example, the forward end 15 of the longitudinal frame member 13 may include a transverse bar 17 for attachment to the rod members 19 of a typical three-point hitch mechanism of the tractor T in any manner apparent to those skilled in the art (see FIGS. 1 and 5). The disc apparatus 11 can then be raised and/or lowered by way of the typical three-point hitch mechanism of the tractor T and will now be apparent to those skilled in the art.

The disc apparatus 11 includes at least one cross frame member attached to the longitudinal frame member 13 substantially transverse thereof. Preferably, the disc apparatus 11 includes a first or forward cross frame member 21 attached to the longitudinal frame member substantially transverse thereof and a second or rearward cross frame member 23 attached to the longitudinal frame member 13 substantially transverse thereof (see FIG. 1). The forward and rearward cross frame members 21, 23 preferably extend between the upper and lower cross frame members 13', 13" and are substantially identical. Thus, the following description of the rearward cross frame member 23 should suffice. The rearward cross frame member 23 is preferably pivotally attached to the longitudinal frame member in any manner apparent to those skilled in the art such as by way of a pivot pin 25 extending through the longitudinal frame member 13 and through the cross frame member 23 substantially intermediate the opposite end of the cross frame member (see FIGS. 3 and 4). A stop means is preferably provided for limiting rotation of the cross frame member 23 about the pivot pin 25. More specifically, a pair of stop pins 27, 29 are preferably coupled to the longitudinal frame member 13 at a location so as to limit rotation of the cross frame member 23 to a range of substantially 15° from a trasverse imaginary line that is perpendicular to the longitudinal axis of the longitudinal frame member 13 (see FIGS. 3 and 4). A pair of angle members 30 are preferably welded or otherwise attached to both sides of the longitudinal frame member 12 adjacent the pivot pin 25 and the stop pins 27, 29 extend through and are fixedly attached to the angle members 20 as clearly shown in FIG. 4.

The disc apparatus 11 includes a first disc blade gang attached to the forward cross frame member 21 and preferably includes a second disc blade gang attached to the rearward cross frame member 23. The first and second disc blade gangs are substantially identical and a description of the second disc blade gang should suffice. The second disc blade gang includes a first disc blade set 35 attached to the cross frame member 23 on one side of the longitudinal frame member 13 and includes a second disc blade set 37 attached to the cross frame member 23 on the other side of the longitudinal frame member 13 (see FIG. 1). Each of the disc blade sets 35, 37 include a plurality of disc blade members 39 (see FIGS. 1, 2 and 7). Each disc blade member 39 of each disc blade set 35, 37 preferably has a different outside diameter and is attached to the cross frame member 23 in such a manner that the outside diameter of each blade member 39 increases at a substantially uniform rate from the blade member 39 farthest from the longitudinal frame member 13 to the blade member 39 closest to the longitudinal frame member 13. Thus, the disc blade member 39 having the smallest outside diameter is located farthest from the longitudinal frame member 13 and the disc blade member 39 having the largest outside diameter is located closest to the longitudinal frame member 13. The lowermost portion of each blade member 39 of each blade set 35, 37 is substantially level with the lowermost portion of the other blade members 39 of that blade set 35, 37 when the disc apparatus 11 is in use (see FIG. 2). The blade set 35, 37 may be attached to the cross frame member 23 in any manner apparent to those skilled in the art. Preferably, the blade members 39 are mounted on an axle 41 (see, in general, FIG. 7). Spacers 43 are provided on the axle 41 to properly position the blade members 39 apart from one another (see, in general, FIG. 7). The axle 41 is preferably rotatably attached to an intermediate member 45 by way of bearings means 47 that are fixedly supported from the intermediate member 45 by way of arms 49 and bearing housing 51 (see FIGS. 2, 6 and 8). The intermediate member 45 is in turn movably attached to the cross frame member 23 to allow the blade members 39 to be properly adjusted relative to the ground and the like. More specifically, the outer end 45' of the intermediate member 45 is attached to the outer end of the cross frame member 23 by way of an adjustable strap means 53 (see FIG. 2). The inner end 45'' of the intermediate member is pivotally mounted to a support member 55 by way of a generally horizontal pivot pin 57 (see FIG. 6). The support member 55 includes an arm-like portion 59 for being attached substantially intermediate the inner and outer end 45', 45'' of the intermediate member 45 by way of a pin 61 which extends through the intermediate member 45 and into one of a plurality of apertures 63 in the arm-like portion 59 to thereby allow the intermediate member 45 to be adjusted in a substantially vertical direction (see FIGS. 2 and 6). The support member 55 is in turn pivotally attached to the cross frame member 23 by way of a substantially vertical pivot pin 65 which extends upwardly through a support housing means 67 fixedly attached to the cross frame member 23 (see, in general, FIGS. 1 and 2). A collar 69 or the like extends about the vertical pivot pin 65 above the support housing means 67 to hold the vertical pivot pin 65 therein (see, in general, FIG. 2).

The apparatus 11 may be constructed in various specific manners and sizes as will now be apparent to those skilled in the art. Preferably, the combined width of the first and second disc blade sets 35, 37 will be about 12 feet (roughly 2.7 meters). Various components may be added to the apparatus 11. For example, scrapers (not shown) may be attached to the intermediate member 45 for substantially engaging each blade member 35 to prevent and build-up of dirt or the like on the blade members 35 as will be apparent to those skilled in the art. The apparatus 11 is used in a substantially typical manner to form a levee L. That is, the apparatus 11 is merely pulled along the ground in the direction the levee L is to be formed and the blade members 39 of the opposing first and second disc blade sets 35, 37 will move dirt toward the center longitudinal axis of the apparatus 11 to form a levee L. Depending on the soil conditions and the desired height of the levee, one to three passes may be made (this is in contrast to prior art levee forming apparatus where three to six passes are required). Because of the specific construction of the blade sets 35, 37, only a relative shallow furrow F (see FIG. 2) will be created when the levee L is formed (this is also in contrast to prior art levee forming apparatus where relatively deep furrows on either side of the levee are created). Factors which, to a lesser or greater degree, allow such a relatively shallow furrow to be created are: (1) the relative great width of the apparatus 11 whereby dirt from a larger surface area is used to form the levee L, (2) the decreasing size of the disc blade members 39 away from the center longitudinal axis of the apparatus 11, (3) the fact that the lowermost portion of each disc blade member 39 of each blade set 35, 37 is substantially level with the lowermost portion of each of the other blade members 39, (4) the forward and rearward gangs of opposing disc blade sets 35, 37, (5) the pivotal connection of the forward and rearward gangs on the longitudinal frame member 13, etc.

Although the invention has been described and illustrated with respect to a preferred embodiment thereof, it is not to be so limited since changes and modifications may be made therein which are within the full intended scope of the invention.

I claim:

1. A disc apparatus for being pulled by a tractor and for forming levees, said apparatus comprising:
    (a) a longitudinal frame member having a forward end for being attached to said tractor;
    (b) a first cross frame member pivotally attached to said longitudinal frame member substantially transverse thereof;
    (c) a first disc blade gang including a first disc blade set attached to said first cross frame member on a first side of said longitudinal frame member and a second disc blade set attached to said first cross frame member on a second side of said longitudinal frame member;

(d) a second cross frame member pivotally attached to said longitudinal frame member substantially transverse thereof and rearward of said first cross frame member;

(e) a second disc blade gang including a first disc blade set attached to said second cross frame member on a first side of said longitudinal frame member and a second disc blade set attached to said second cross frame member on a second side of said longitudinal frame member; each of said disc blade sets including a plurality of disc blade members with each blade member having a different outside diameter and with the outside diameter of each blade member increasing at a substantially uniform rate from said blade member farthest from said longitudinal frame member to said blade member closest to said longitudinal frame member; and (f) stop means for limiting pivotal movement of said first and second cross frame members on said longitudinal frame member to a range of substantially 15°.

2. The apparatus of claim 1 in which the lowermost portion of each of said blade members of said first and second disc blade sets of said first and second disc blade gangs is substantially level with the lowermost portion of each of the other blade members of that disc blade set.

3. The apparatus of claim 2 in which a levee can be formed with relative shallow depressions on either side thereof and utilizing only the very uppermost layer of top soil.

* * * * *